Figure 1:
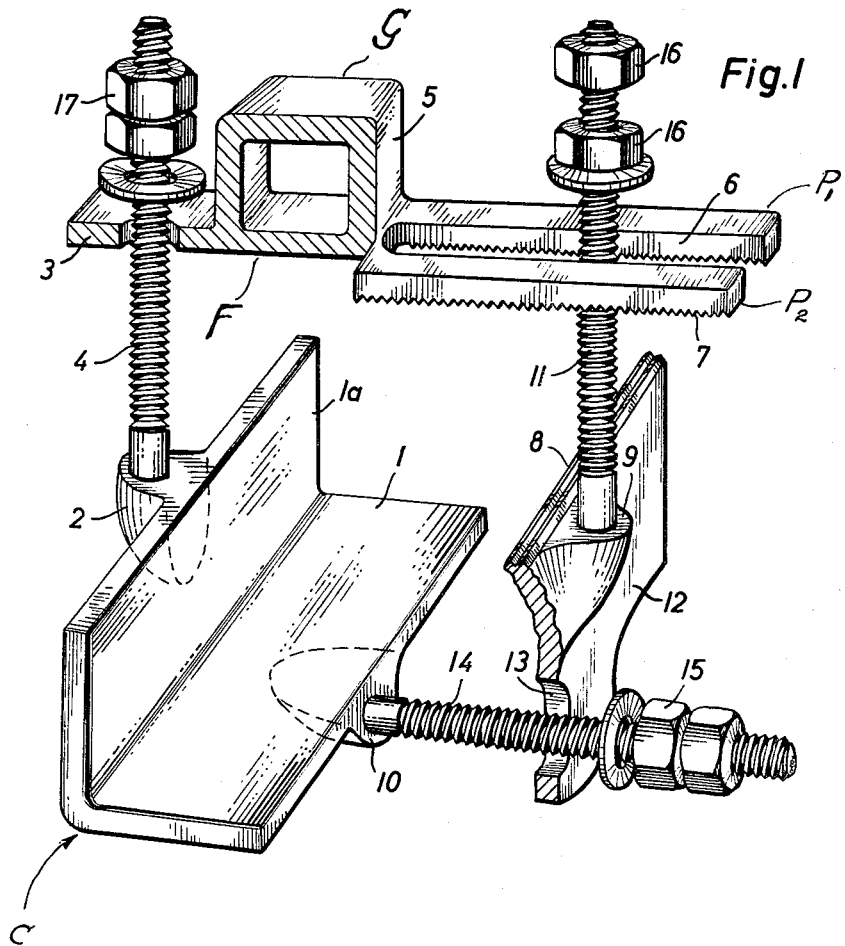

Feb. 9, 1960 J. HOMMA 2,923,995
CLAMP
Filed April 14, 1958

INVENTOR
Josef Homma
BY Michael S. Striker
Attorney

United States Patent Office 2,923,995
Patented Feb. 9, 1960

2,923,995
CLAMP
Josef Homma, Wiesbaden, Germany
Application April 14, 1958, Serial No. 728,362
3 Claims. (Cl. 24—263)

This invention relates to clamps for encasing the broken leaf spring of an automobile, in order to allow the vehicle to proceed until a replacement of the spring can be effected.

Such springs are in the nature of composite leaf springs usually comprising an assembly of superposed elongated spring leaf elements of successively decreasing length. Consequently, along the length of the spring the thickness thereof varies from a maximum due to the accumulated thicknesses of the superposed spring elements, to a minimum at the outer end of the spring where the thickness may be for instance only that of a single spring element. In case of fracture of the spring, which may occur at any point between maximum and minimum thickness of the spring, such variations in thickness present the difficulty of providing an emergency clamp that will securely encase the spring from all sides, irrespective of the thickness of the spring, so as to securely compress the spring leaf element as well as to secure them against lateral displacement and against disalignment.

In view of the foregoing problem, in order to avoid having to carry differently dimensioned emergency clamps for different occasions, the invention provides a clamping structure having two pairs of oppositely disposed clamping walls which may be tightened relative to each other so as to encase the region of the fracture of the spring securely from all sides of the spring, namely the side faces and the end faces thereof, in such a manner as to prevent displacement of any of the leaf elements in the assembly.

According to the invention, one clamping wall member is provided with two opposite clamping faces one of which is presented by a projection or lug on this wall member. This wall member is so arranged that it may be mounted in either of two clamping positions in one of which the lug is directed towards the spring, and in the other of which the lug is directed away from the spring. Thus, by employing the auxiliary face of the lug, the effective distance between opposite end clamping walls of the clamping device may be reduced so that the clamp may be used over a wide range of thicknesses of the spring.

The invention may be embodied in a clamp construction having a corner clamp member or angle member the shank portions of which represent a pair of clamping walls adapted to engage upon a pair of corresponding sides of the spring, and further having a pair of complementary clamping walls movable relative to this corner member as well as relative to each other, which may be tightened with respect to the corner member as well as relative to each other, thereby securely encasing the region of the fracture of the spring from all sides. According to the invention, one of the movable complementary clamping walls is reversible in such a manner that an auxiliary clamping face provided thereon may be brought to bear against the spring, for example, at the thin end thereof.

Other features lie in details of construction of the various clamping members, as well as in the manner of cooperately combining them.

Figure 2:
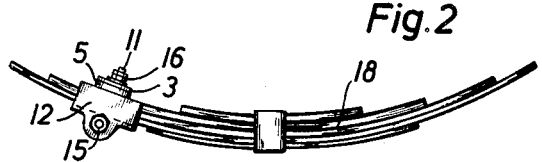

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of the clamp, with parts thereof shown partially sectioned; and
Fig. 2 illustrates the application of the clamp, showing a leaf spring with the clamp in place thereon.

Referring to Fig. 1, the invention is illustrated in one embodiment of a clamp construction which comprises a corner clamp member or angle-shaped element C the shank portions of which provide clamping walls 1 and 1a, at right angles to each other. The shank portions are formed with outward lugs 10 and 2, respectively, with a screw bolt or threaded stud 4 extending from the lug 2 and another screw bolt or threaded stud 14 extending rigidly from the lug 10. The screw bolts 4 and 14 are disposed coextensive with the shank portions 1 and 1a substantially at right angles to each other, each screw bolt being spaced slightly outwardly from and parallel to the inner clamping face of the respective associated shank portion of the corner clamp member.

A movable clamping wall member or wall 3 which is complementary to the wall or shank portion 1, is movable upon the bolt 4 extending through a hole in the jaw member 3. A pair of lock nuts 17 upon the bolt 4 may be manipulated for pressing the wall member 3 against the spring as will be described below.

For the purposes of this invention, the complementary wall member 3 has a main clamping face F appearing at the underside thereof as shown in drawing Fig. 1, and in addition thereto is formed with a hollow box-shaped lug or projections 5 presenting an auxiliary clamping face G spaced from and parallel to the main clamping face F. According to this invention, the position of the clamping wall 3 may be reversed from the upright position shown in the drawing to an inverted position, so that thereby the auxiliary clamping face G may be brought to bear upon the relatively thin portion of the spring where the fracture may have occurred.

In the present example, the complementary wall 3 is furthermore formed with a bi-furcated outer end portion having a pair of prongs $p_1$ and $p_2$ defining between them an elongated space or slot 6. The underside of the bi-furcated portion or prongs may be roughed up or be formed with a series of transverse indentations 8 of saw-tooth shape extending parallel to the top edge portion of a second complementary clamping member or wall 12, which top edge portion may be formed with one or more correspondingly toothed ridges or edges adapted to inter-engage with the indentations or serrations presented by the saw-tooth formation 7 of the clamping member 3. The clamping wall 12 is loosely mounted on the screw bolt 14 of the corner member, with the bolt passing through an elongated opening 13 provided in wall member 12. This wall member 12 has an outward lug 9 from which rises a screw bolt 11 to extend transversely of the associated complementary wall member 3 while passing through the space or slit 6 in the bi-furcated end thereof. A pair of lock nuts 16 on bolt 11 may be manipulated to effect tightening of the complementary wall member 3 against the associated complementary wall member 12.

It will be seen that after the clamp structure shown in Fig. 1 will have been positioned to surround the fracture of the spring, the various clamping walls may be tightened up against each other in such a manner that the fracture of the spring will be tightly encased from all sides as indicated in the example of such an application shown in Fig. 2, with the walls engaging the vertical side faces and the horizontal end faces of the spring. That is to say, manipulation of the lock nuts 15 on the bolt 14 will first partially tighten the wall member 12 relative to the opposite clamping face of shank portion 1a of the corner member, whereas manipulation of the lock nuts 17 on bolt 4 will at first partially tighten the jaw member 3 relative to the opposite clamping face of shank portion 1 of the corner member. If desired, the assembly may be such that the teeth 8 of wall member 12 become interengaged with corresponding indentations of the tooth formation 7 of wall member 3, whereupon the lock nuts 16 may be manipulated to effect tightening of the complementary movable wall members 3 and 12 with respect to one another as well as with respect to the shank portions 1 and 1a of corner member C.

While Fig. 2 shows the emergency clamp of this invention secured in place upon a leaf spring 18 at a point thereof at which the fracture may have occurred, the manner of application will appear most clearly from the following description of the manipulating steps.

According to the positioning of the parts as illustrated in Fig. 1, the clamping wall 12 with its bolt 11 may be swung or tilted to the right (as seen in the drawing) so that the screw bolt 11 sliding out of space 6 of member 3 will drop clear of member 3, this tilting movement being made possible by the bolt 14 operating loosely in the elongated hole 13 in the wall 12. With the clamp thus in an open condition the structure may be slipped over and positioned upon spring 18 shown in Fig. 2. The wall 12 with bolt 11 is then swung back into cooperation with the bi-furcated end of member 3 whereupon all the lock nuts 15, 16, 17 of bolts 14, 11 and 4, respectively, may be tightened substantially in the manner above indicated. This tightening operation forces the assembly of leaf spring elements against the corner member C and to be tightly pressed into place by walls or clamping members 12 and 3. In this way, the fracture of the spring becomes tightly encased by clamping walls from all sides, so that the broken ends of the spring are thereby firmly secured.

The adjustability of the complementary walls 12 and 3 relative to the corner member C makes it possible to accommodate springs of a large variety of dimensions. If the fracture occurs in cases where the leaf spring elements as such or else the leaf spring assembly as a whole is very thin, the excessive height of wall 1a of the corner member and of the complementary opposite wall 12 would be so great as to prevent the clamping face F of the wall 3 to exert the requisite clamping pressure upon the spring. Yet, it is also necessary that the side walls 1a and 12 be of an adequate height to provide a suitable backing for the leaf spring elements to be pressed thereagainst, to insure them against lateral displacement or disalignment.

While this requirement would limit the range of applicability of the clamp device to the exclusion of the thinner springs or of the thin ends of the springs or would necessitate the provision of a plurality of differently dimensioned clamps, such drawback is eliminated according to one embodiment of this invention by the provision of the box-shaped lug or projection 5 shown to be integral with the complementary wall member 3. By the simple operation of reversing the clamping wall member 3 from the position shown in Fig. 1 to an inverted position, it is possible to have the projection 5 extend deeply into the space between the side walls 1a and 12, so that in this way even very thin leaf springs or the thinner ends of the leaf springs may be accommodated in this device and held under adequate pressure by the auxiliary clamping face G.

Thereore, in the practice of this invention, after a fracture has occurred, it is possible within a few minutes to restore the broken spring at least to such an extent that the vehicle may proceed under its own power until a proper repair may be effected. Even where the fracture of only a single leaf element has occurred rather than a fracture through the entire spring, the present emergency clamp may be applied to great advantage, experience having shown that once a single leaf element has broken, it will take only relatively small shocks to cause the fracture of additional leaf elements with the result that the entire spring collapsed.

It will be seen that the invention makes it possible to provide an emergency clamp applicable to fractures irrespective of the dimensions of the spring and irrespective of the point of thickness at which the fracture may have occurred. It will also be appreciated that these advantages are obtainable without the need of providing any additional part or parts, and that in the present embodiment with the minimum of three component parts, these parts are loosely interconnected when not in use so they will not come apart, and may be moved clear one of the other sufficient to allow the clamp to be placed around and positioned upon the spring at the point of fracture thereof. Once thus positioned, it is a simple matter to manipulate the three sets of lock nuts 15, 16, 17 to effect the proper tightening of the clamp upon the spring.

It will be understood that each of the elements described above, or two or more together, may also find a useful application in other types of clamps differing from the types described above.

While the invention has been illustrated and described as embodied in a clamp for a composite automobile spring of the leaf spring type, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A clamp for a composite automobile spring of the leaf spring type having a pair of opposite vertical side faces and a pair of opposite top and bottom faces comprising, in combination, a corner member having a pair of shank portions providing a pair of clamping walls adapted to engage a side face and one of said top and bottom faces of the spring; a pair of complementary clamping walls opposite respective shank portions of said corner member; means for movably connecting each complementary clamping wall to a respective shank portion of the corner member together with means for movably connecting the complementary clamping walls with each other, in such a manner that said complementary clamping walls are movable towards and away from their respective opposite shank portions and adapted to engage respective adjacent faces of the spring, the complementary clamping wall engaging one of the top and bottom faces of the spring having two clamping faces one of which is provided by a projection thereon, one of said complementary clamping walls being mounted so that it may be arranged in either of two clamping positions in one of which positions said projection faces toward the opposite shank portion for clamping a thin spring portion and in the other of which positions said projection faces away from said opposite shank portion so that the clamping wall and the respective shank portion are further spaced for clamping a thick spring portion; and means for tightening the enclosing walls into clamping engagement with respective side faces and top and bottom faces of the spring.

2. A clamp for a composite automobile spring of the leaf spring type having a pair of opposite vertical side faces and a pair of opposite top and bottom faces comprising, in combination a corner member having a pair of shank portions providing a pair of clamping walls adapted to engage a side face and one of said top and bottom faces of the spring; a pair of complementary clamping walls opposite respective shank portions of said corner member; means for movably connecting each complementary clamping wall to a respective shank portion of the corner member in such a manner that said complementary clamping walls are movable towards and away from their respective opposite shank portions and adapted to engage respective adjacent faces of the spring, the complementary clamping wall engaging one of the top and bottom faces of the spring having two clamping faces one of which is provided by a projection thereon, one of said complementary clamping walls being mounted so that it may be arranged in either of two clamping positions in one of which positions said projection faces toward the opposite shank portion for clamping a thin spring portion and in the other of which positions said projection faces away from said opposite shank portion so that the clamping wall and the respective shank portion are further spaced for clamping a thick spring portion; means for movably connecting said complementary clamping walls with each other in such a manner that said complementary walls are movable towards and away from their respective opposite shank portions, said connecting means comprising a bi-furcated end portion mounted on one of said complementary clamping walls and a cooperative screw bolt extending rigidly from the associated complementary clamping wall; and means for tightening the enclosing walls into clamping engagement with respective side faces and top and bottom faces of the spring.

3. A clamp for a composite automobile spring of the leaf spring type having a pair of opposite vertical side faces and a pair of opposite top and bottom end faces comprising, in combination, a corner member having a pair of shank portions providing a pair of clamping walls adapted to engage a side face and one of said top and bottom faces of the spring; a pair of complementary clamping walls opposite respective shank portions of said corner member; means for movably connecting each complementary clamping wall to a respective shank portion of the corner member in such a manner that said complementary clamping walls are movable towards and away from their respective opposite shank portions and adapted to engage respective adjacent faces of the spring, the complementary clamping wall engaging one of the top and bottom faces of the spring having two clamping faces one of which is provided by a projection thereon, one of said complementary clamping walls being mounted so that it may be arranged in either of two clamping positions in one of which positions said projection faces toward the opposite shank portion for clamping a thin spring portion and in the other of which positions said projection faces away from said opposite shank portion so that the clamping wall and the respective shank portion are further spaced for clamping a thick spring portion; means for movably connecting said complementary clamping walls with each other in such a manner that said complementary walls are movable towards and away from their respective opposite shank portions, said connecting means comprising a bi-furcated end portion mounted on one of said complementary clamping walls and a cooperative screw bolt extending rigidly from the associated complementary clamping wall, said bi-furcated end portion and the edge of the associated complementary side wall being formed with alternating indentations and projections whereby projections of the one are adapted to engage with indentations of the other; and means for tightening the enclosing walls into clamping engagement with respective side faces and top and bottom faces of the spring.

References Cited in the file of this patent

UNITED STATES PATENTS

| | | |
|---|---|---|
| 705,932 | Kennedy | July 29, 1902 |
| 873,077 | Patnod | Dec. 10, 1907 |
| 1,000,389 | Ette | Aug. 15, 1911 |
| 1,763,128 | Bolland | June 10, 1930 |
| 2,461,256 | Black | Feb. 8, 1949 |